United States Patent [19]
Kalb et al.

[11] 3,738,750

[45] June 12, 1973

[54] DOPPLER SHIFT LASER VELOCIMETER DATA PROCESSOR

[75] Inventors: Henry T. Kalb, Manchester; Frank L. Crosswy, Tullahoma; Edward B. Harding, McMinnville, all of Tenn.

[73] Assignee: The United States of America as represented by the Secretary of the Air Force, Washington, D.C.

[22] Filed: Dec. 10, 1970

[21] Appl. No.: 96,817

[52] U.S. Cl. ............... 356/28, 343/5 DP, 343/8
[51] Int. Cl. ............................................. G01p 3/36
[58] Field of Search ................ 356/28; 343/8, 5 DP

[56] References Cited
UNITED STATES PATENTS
3,315,258  4/1967  Dillard ........................... 343/5 DP
3,167,738  1/1965  Westerfield ..................... 343/5 DP FOREIGN PATENTS OR APPLICATIONS
1,953,630  4/1970  Germany ........................... 356/28
1,198,585  8/1965  Germany ........................... 356/28

OTHER PUBLICATIONS
Brayton, "Proceedings of 16th International Aerospace Instrumentation Symposium", 5–1970, S01450028.

Primary Examiner—Samuel Feinberg
Assistant Examiner—S. C. Buczinski
Attorney—Harry A. Herbert, Jr. and George Fine

[57] ABSTRACT

An apparatus for extracting doppler shift frequency information from signals which are produced by dual scatter laser velocimeter over the doppler frequency range of 1 to 300 MHz. The laser doppler velocimeter data which is translated and processed into a form compatible with digital computer inputs may be obtained for very short scan times.

1 Claim, 7 Drawing Figures

3,738,750

DOPPLER SHIFT LASER VELOCIMETER DATA PROCESSOR

BACKGROUND OF THE INVENTION

The present invention relates broadly to a doppler shift laser velocimeter data processor and in particular to a data processing system for extracting doppler shift frequency information from dual scatter laser velocimeters.

The Doppler effect is a change in the observed frequency of sound, light or other waves which is caused by the motion of the source or the observer. A familar example for sound waves is the increase or decrease in pitch of a train whistle as the train approaches or passes. The optical phenomenon may be observed in the altered frequencies of spectral lines in the light which is emitted from a moving star. Thus, in astronomy, color difference between the approaching and receeding sides have been used to compute the rotation of the sun and other planets. If the star and the earth are moving closer toward one another, more light pulses are received in a given time interval, and the color which is emitted from the star appears to be shifted toward the violet end of the spectrum. When the distance between the earth and the star is increasing, the observed light is shifted toward the red end of the spectrum.

In the prior art, laser have been utilized to obtain doppler shift frequency shift information. However, the data processing of the Doppler information to obtain the frequency shift data has been rather slow and cumbersome. The prior art methods for maximizing valid data acquistion have had a low confidence factor. Further, it has been rather difficult to provide an asynchronous data accumulation without sacrificing data accuracy. The present invention provides an apparatus which solves the foregoing problems while operating at sampling rates of greater than 1000 data points per second. The data processor is not restricted to random data inputs but may operate on CW data information as well.

SUMMARY OF THE INVENTION

The present invention utilizes a data processing system for extracting doppler shift frequency information from signals which are produced by dual scatter laser velocimeter over the doppler frequency shift range of 1 to 300 MHz.

The dual scatter laser velocimeter is utilized in the presence of low seeding densities, where the desired doppler shift frequency information is contained within random occuring short duration frequency bursts superimposed on a base line shift. The data processor is a random time sampling, computing, high speed counter with buffer storage for "on line" recording of turbulent air or fluid flow patterns. The data processor removes the base line shift (pedestal) and improves the rise time characteristics of the doppler frequency pulse train. It samples as few as eight pulses of frequency information and determines the period average of the doppler frequency over the range of 1 MHz to 300 MHz.

A minimum sampling rate of 1,000 data points per second is utilized. The processor is not restricted to random data but performs also with CW information.

A visual display of the average period sampled may be utilized. Alternately, a number of data points may be stored in an integral buffer storage, for later transfer to an attached data acquistion system, such as a magnetic tape or paper tape system. An integral arithmetic processor performs "on-line" conversion of sampled period to frequency and subsequently to velocity of light scattering seed particles entrained in the air stream. A data filtering technique is utilized to minimize acquisition of false data due to significant noise sampled with the frequency burst or the sampling of a partial frequency burst with less than eight pulses present. A series of analog band pass filter channels restricts the sampled data to a nominal one octave of the frequency spectrum and provides an automatic channel selector or signal seeker for tracking turbulent flow patterns.

It is one object of the invention, therefore, to provide an improved doppler shift laser velocimeter data processor capable of sampling as few as eight pulses of frequency information to determine the period average of the doppler frequency over the range of 1 MHz to 300 MHz.

It is an another object of the invention to provide an improved laser velocimeter data processor apparatus having a minimum sampling rate of one thousand data points per second.

It is yet another object of the invention to provide an improved data processor apparatus utilizing a data filtering technique to minimize acquisition of false data due to significant noise present in the sampled frequency burst.

It is still another object of the invention to provide a data processor apparatus having a series of analog band pass filter channels to restrict the sampled data to a nominal one octave of the frequency spectrum.

These and other advantages, features and objects of the invention will become more apparent from the following description taken in connection with the illustrative embodiment in the accompanying drawings.

DESCRIPTION OF THE DRAWINGS

FIG. 6 is a graphic representation of the waveforms utilized in the pulse train comparator, and;

FIG. 7 is block diagram of the pulse train comparator.

DESCRIPTION OF PREFERRED EMBODIMENT

Figure 1:
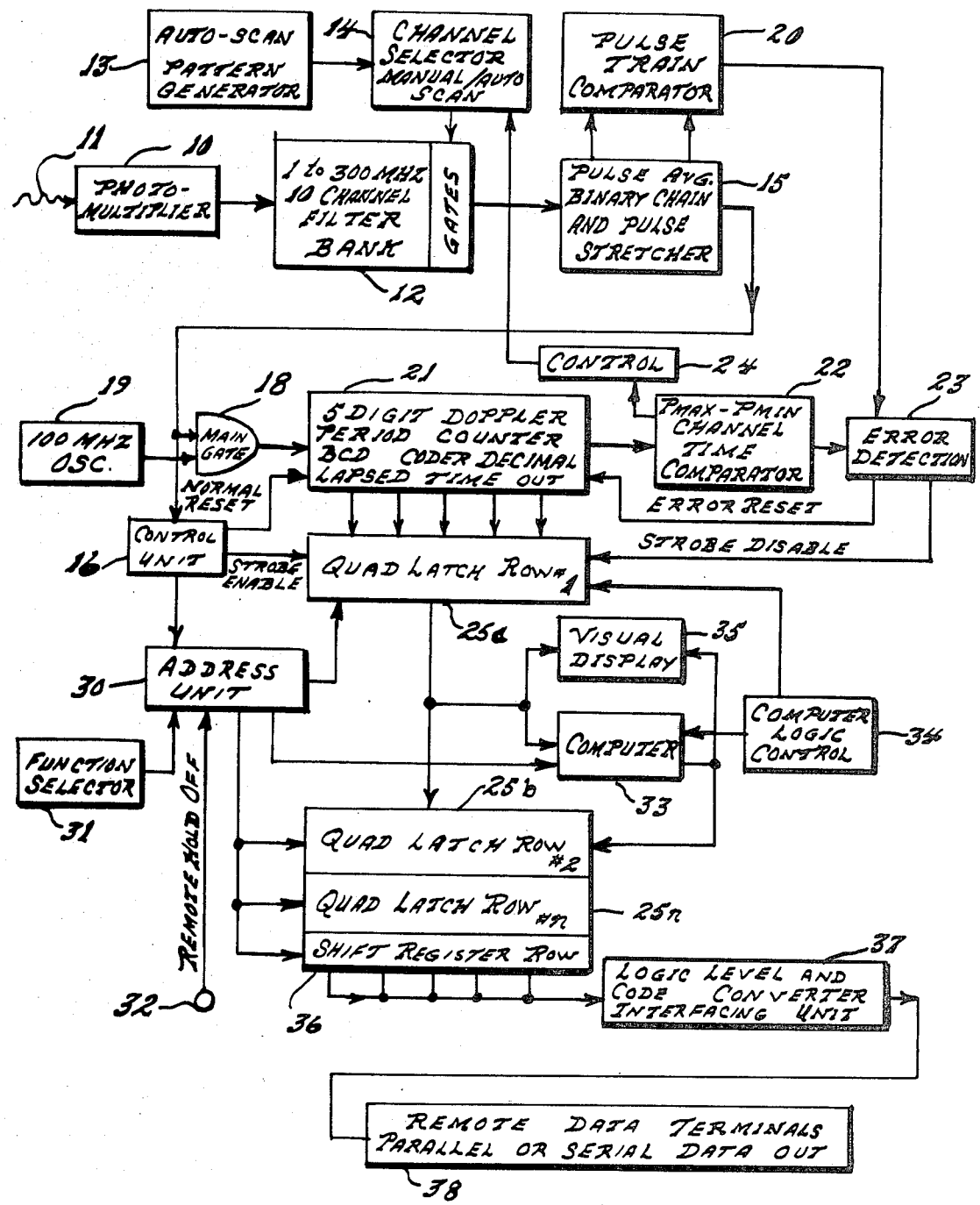
FIG. 1 is a block diagram of the doppler shift laser velocimeter data processor apparatus in accordance with this invention.

Referring now to FIG. 1, there is shown a block diagram of the doppler shift laser velocimeter data processor apparatus utilizing a photomultiplier 10 to doppler shift laser information 11. The photomultiplier 10 is connected to a ten channel filter bank 12 having a range of 1 to 300 MHz. An auto-scan pattern generator 13 is connected to channel selector unit 14 having manual/auto scan selection. The ten channel filter bank 12 is connected to the pulse averaging binary chain and pulse stretcher unit 15 by means of gates which are located in the filter bank 12. The pulse averaging binary chain and pulse stretcher 15 provides outputs to the pulse train comparator 20, the main gate 18, and control unit 16. A 100 MHz oscillator 19 provides an additional input to main gate 18. A five digit doppler period counter 21 receives input signals from the main gate 18 and control unit 16 and provides an output to channel time comparator 22. Error detection unit 23 receives inputs from pulse train comparator 20 and channel time comparator 22 to provide an error reset signal back to the five digit doppler period counter 21. Control unit 24 receives an input signal from channel time comparator 22 and provides an output to channel selector 14. Control unit 16 provides a normal reset signal to period counter 21 and a strobe enable signal to quad latch 25a row number one. Address unit 30 receives input signals from control unit 16; function selector 31 and a remote hold off signal via terminal 32. The address unit 30 provides input signals to quad latchs 25a–25n rows # 1– # n (where n is any positive integer) and to computer unit 33. A computer logic control unit 34 provides control signals to the computer 33 and to quad latch 25a row 1. Visual display 35 receives inputs signals from both the computer 33 and the quad latch 25a row 1. The shift register row 36 which is connected to quad latch 25n row n provides an output signal to interfacing unit 37 which is connected to remote data terminal 38.

Figure 2:
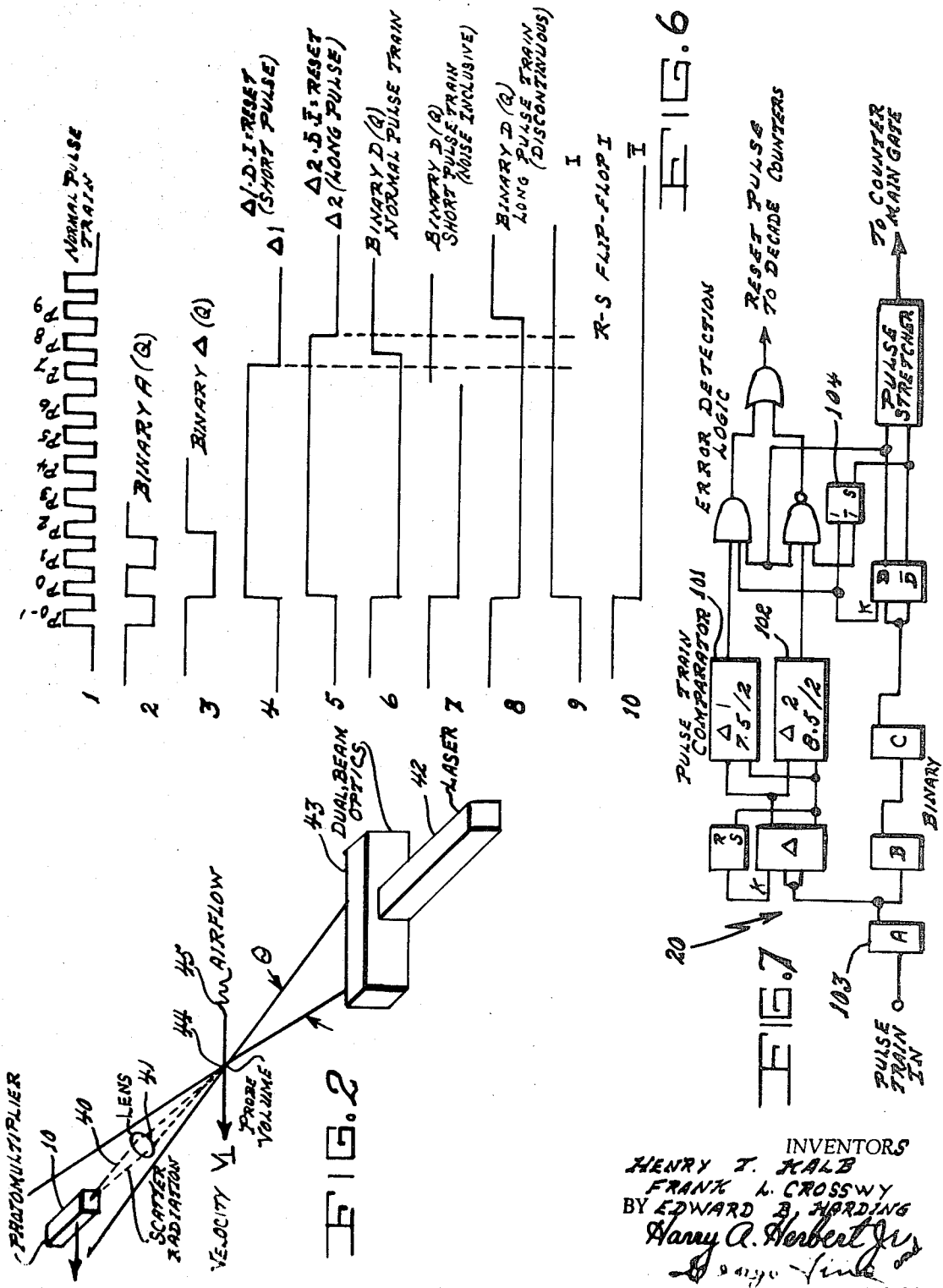
FIG. 2 is a block diagram of the dual scatter laser velocimeter.

FIG. 2 illustrates a dual scatter laser velocimeter. Photomultiplier 10 receives scatter radiation 40 through lens 41. A laser 42 is utilized in conjunction with dual beam optics unit 43 to form a probe volume at point 44, the intersection point of the dual laser beams. The velocity V of the airflow 45 through the point 44 produces a doppler shift which is proportional to the airflow. The laser cross beam geometry, beam relative intensity, particle (scatter center) size, region of passage through the probe volume as well as particle velocity combine to produce signals of varying doppler frequency to pedestal heights, and number of pulses of doppler information per frequency burst. An optimum signal would be produced by a scatter center passing through the center geometry of a probe volume formed by two equal intensity crossed beams.

Figure 3:
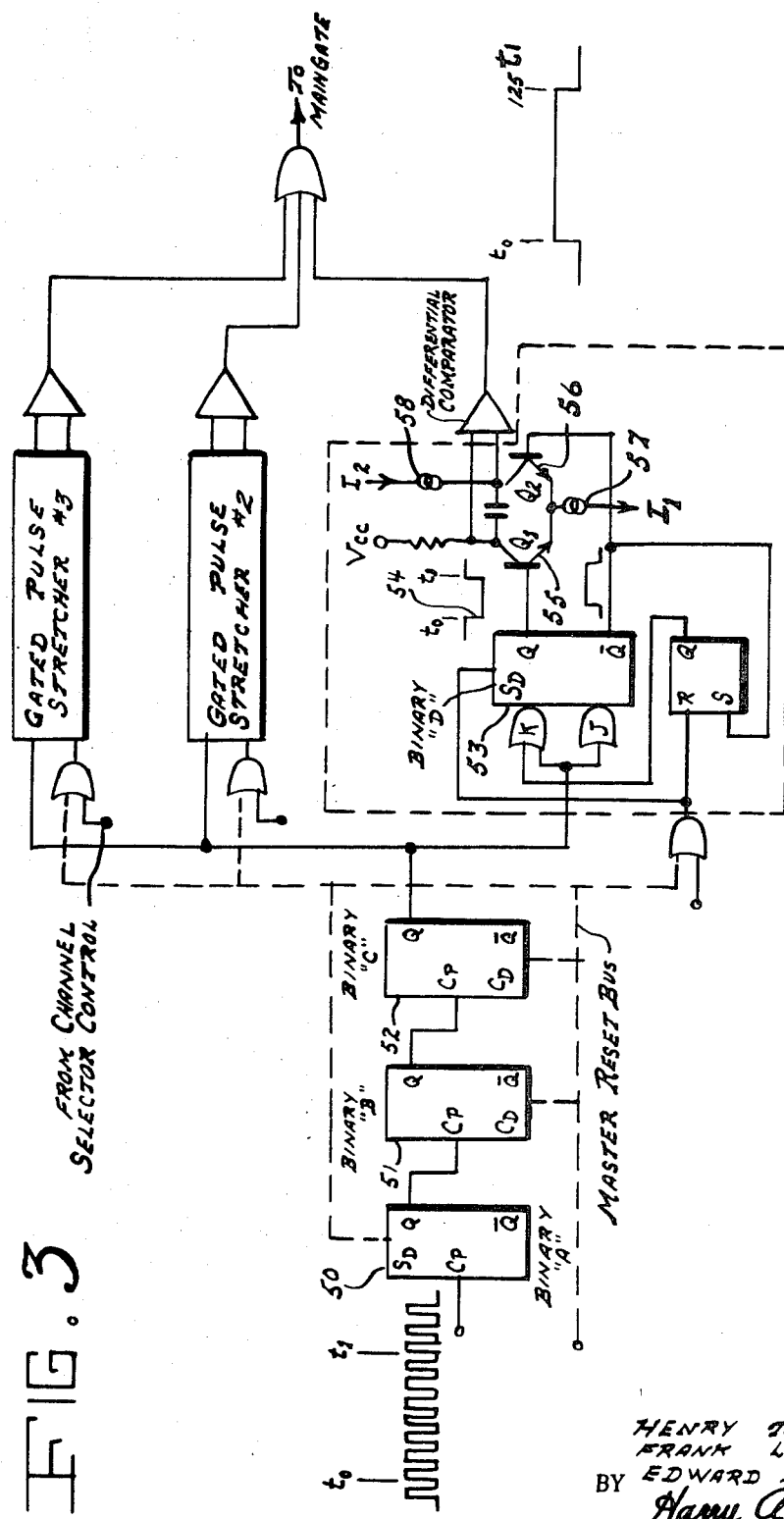
FIG. 3 is a schematic diagram of the pulse averaging binary chain.

Doppler shift information with as few as eight pulses per burst is presented to a "period averaging" flip-flop chain consisting of Binaries 50 through 53 as shown in FIG. 3. Binary 50, is a special high speed (350 MHz) flip-flop capable of toggling at the maximum frequency sampled. The pulse output at Binary 53 has a time duration of [1/freq. sampled] × 8 (seconds). This pulse 54 is shown extending from $t_0$ to $t_1$ and is the gating pulse which is applied to a current gate 55, 56. An expanded time pulse ($t_0$ to 125 $t_1$) is produced at the pulse stretcher output. The time stretch ratio is proportional to the ratio of the two precision current sources, 57 and 58. The stretched pulse represents a time expansion of 1,000, i.e., (125 × 8), of the period of the original frequency sampled and is the gating pulse applied to the main gate 18 of the counter in FIG. 1. The five digit doppler period counters, 21 accumulates pulses produced by the 100 MHz crystal controlled oscillator 19 during the interval that the main gate 18 is open. At the termination of the gating pulse, the period counter 21 retains the accumulated count in the form of a Binary coded decimal 8421 positional weighted code.

A maximum total sampling time of 1 millisecond may be processed by the present apparatus. Thus, the maximum sampling rate for a 1 MHz signal approaches 1,000 samples per second. The maximum sampling rate for a 10 MHz (CW signal) approaches 10,000 samples per second. At these rates the data may be directed to a register temporary storage (asynchronous accumulation) and held for transfer to an attached data acquisition system such as a magnetic tape transport or paper tape printer. The intermediate storage quad latch units 25a–n permit the counter 21 to sample incoming frequency information at its maximum rate while the data acquisition system may acquire stored information at its maximum capable rate. The basic building block for the buffer storage is the quad latch unit 25a which typically consists of four type "D" clocked flip-flops. Information present at a data input is transferred to the flip-flop Q output if the clock is high and the Q output will follow the data input as long as the clock remains high. When the clock goes low, the information that was present at the data input, at the time of the clock transition, is retained at the Q output. Parallel-in parallel-out loading of the bank of latches is accomplished by control logic such that the first BCD data sample taken from the decade counters 21 is transferred directly through the N quad latches 25a–n (all clocks high-all latches read the same data bit). At the counter reset cycle (prior to a second data sample) the clock on the rearmost latch goes low and remains so until the stored data is removed by an attached data acquistion system. Progressive data samples fill the quad latches from rear to front. Thus, the data can be stored at any time and removed at the convenience of the data acquisition system. This is useful in a magnetic tape system to insure a continuous flow of data on to the tape. The counter sampling rate must, of course, be greater than the magnetic tape acquisition rate. The last storage element in the buffer 25a–n is shown as a shift register 36 which permits the parallel presentation of BCD data at the remote data terminals 38 to be converted to a serial pulse train (useful for distance transport and acceptance by such devices as serial data arithmetic processors).

The data sampling system performance is dependent upon an eight cycle pulse train (at the doppler frequency) non-terminating prior to the 8th pulse and free of significant noise during the 8-cycle sampling interval. To minimize the acquisition of false data, a digital filter is included in channel time comparator 22. The basic operation employs a time comparator to set maximum-minimum limits on the gating pulse 54 present at the Binary 53 output (shown in FIG. 3). Since the pulse width, $t_0$ to $t_1$, is equivalent to eight periods of sampled data (emerging from a stipulated channel filter 12 having a defined frequency pass band), the $t_0$ to $t_1$ pulse width must be between an expected maximum and minimum value. In order to insure that gating pulses shorter than the minimum and longer than the maximum (for a given channel filter) are not allowed to produce data for display, the time comparator 22 monitors the $t_0$ to $t_1$ pulse width. For values outside acceptable limits, the comparator will: disable the strobe pulse 9 to the first quad latch row 25a, thus preventing the entry of the counter sampled data into the buffer 25a–n, and will automatically reset the counter 21 for the next occurring frequency burst. The comparator 22 employs a series of AND gates (two gates per filter channel) to detect the presence of coincidence of three conditions. Condition 1 — a coded "1" input exists for the two AND gates guarding the "on line" filter channel, all other filter channel AND gates receive a "0"

input. This control logic signal is applied from the channel selector control 14. Condition 2 — the level state at the Q output of the "D" Binary 53 FIG. 3 will be "1" for a pulse $<p_{min}$ and "0" for a pulse $>p_{max}$. The Q output is applied to a terminal of the two AND gates (observing the required level state for coincidence detection). Condition 3 — the decade counters 21 serve as a countdown or divide by N device such that any lapsed period of time (starting at $t_0$) from 0 to 1 millisecond, in time increments of 10 nanoseconds, is available at selected terminals (in BCD form). Application of the appropriate counter terminals as input information to the AND gates completes the channel time comparator.

Figure 4:
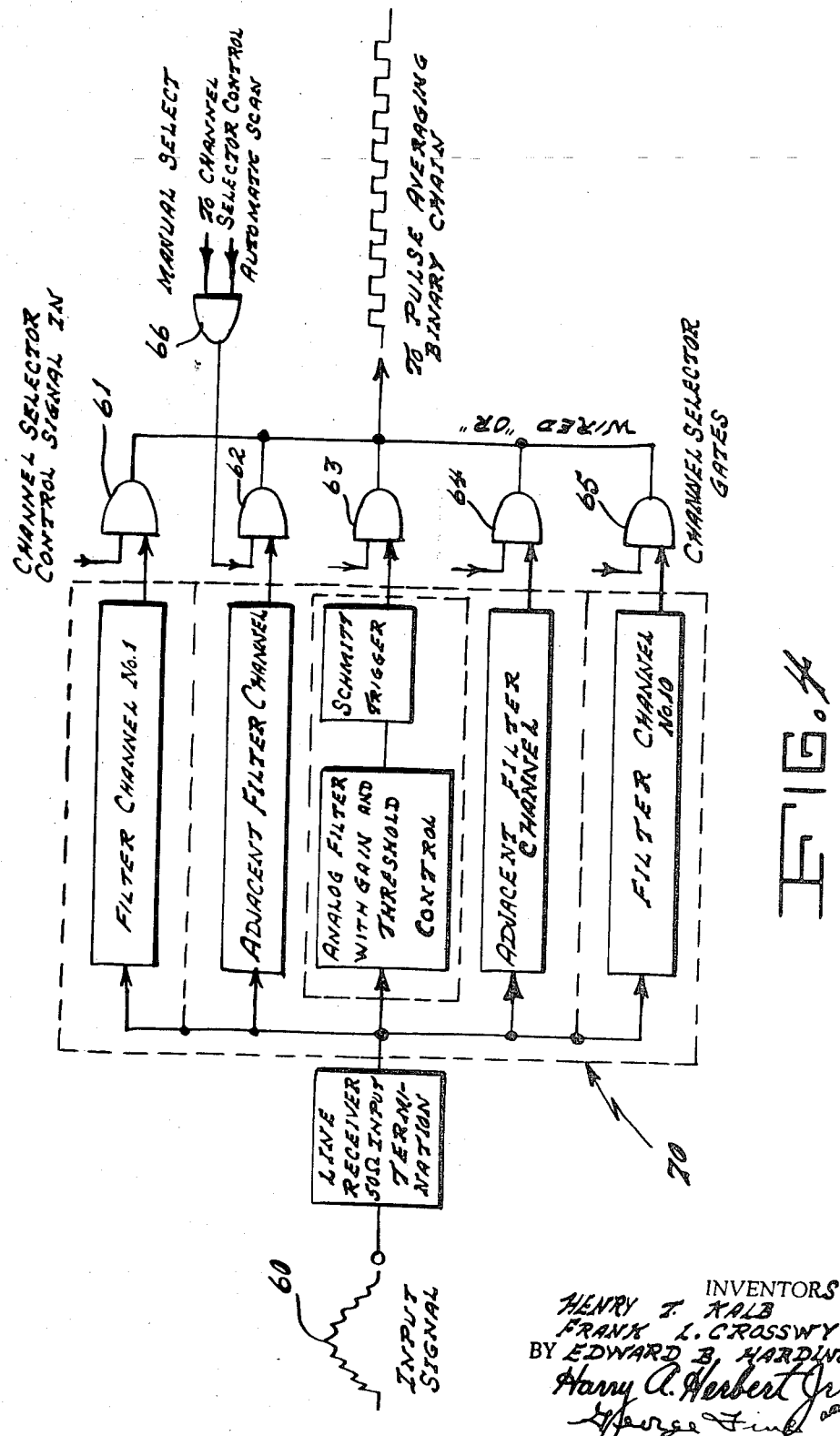
FIG. 4 is a schematic diagram of the ten channel filter bank.

Referring to FIG. 4, the channel filter bank 12 of FIG. 1 is described in greater detail. It can be seen that the incoming sampled frequency burst 60 is parallel fed to 10 channel filters 70 covering the 1 to 300 MHz frequency spectrum. The spectrum is combed into one octave frequency bandwidths and presented to a series of channel selector gates 61—65. Only one gate at a time is permitted to be open. The criterion for proper gate selection is complicated by the quality of the incoming sampled signal. The presence of broad band noise, the ratio of the doppler frequency signal to noise and the slew rate of the signal in turbulent flow conditions, are major factors in channel selection. A manual channel select switch 66 may be used for real time monitoring of the signals prevalent in the various filter channels. The digital filter time comparator 22 AND gates previously described may be employed for channel switching. This would be most useful where the doppler frequency drifts out of one channel into an adjacent channel or across several channels. The $P_{max}$ or $P_{min}$ AND gate would indicate the direction of drift and applied to sub-control logic R-S flip-flops instigate channel by channel gate switching, thus permit tracking the signal. The channel selector gate 66 may be manipulated manually or otherwise simply by applying a logic "0" to the channel gate desired open and a simultaneous logic "1" to all remaining gates.

The counter 21 produces raw data in the form of $1/f$ doppler or the period of the doppler shift frequency. The computer unit 33 is utilized to produce "on line" values of $f$ doppler, or scatter center velocity ($V_\perp$), perpendicular to the laser cross beam probe volume, FIG. 2, V is given by the following equation:

$$V_\perp = [f \text{ doppler } \lambda_0/2n \sin(\theta/2)]$$

where $\lambda_0$ is the wavelength of the emitted radiation, $n$ is the index of refraction of the flow medium, $\theta$ is the included angle between the crossed laser beams.

To simplify: If the flow medium is air, then $n$ can be taken as 1.

For $\theta \leq 20°$, $2 \sin \theta/2 \cong \theta$ and $V_\perp$ is expressed as $$[f \text{ doppler } \lambda_0/\theta] = [\lambda_0/\theta] [1/\text{Period (doppler)}]$$

Figure 5:
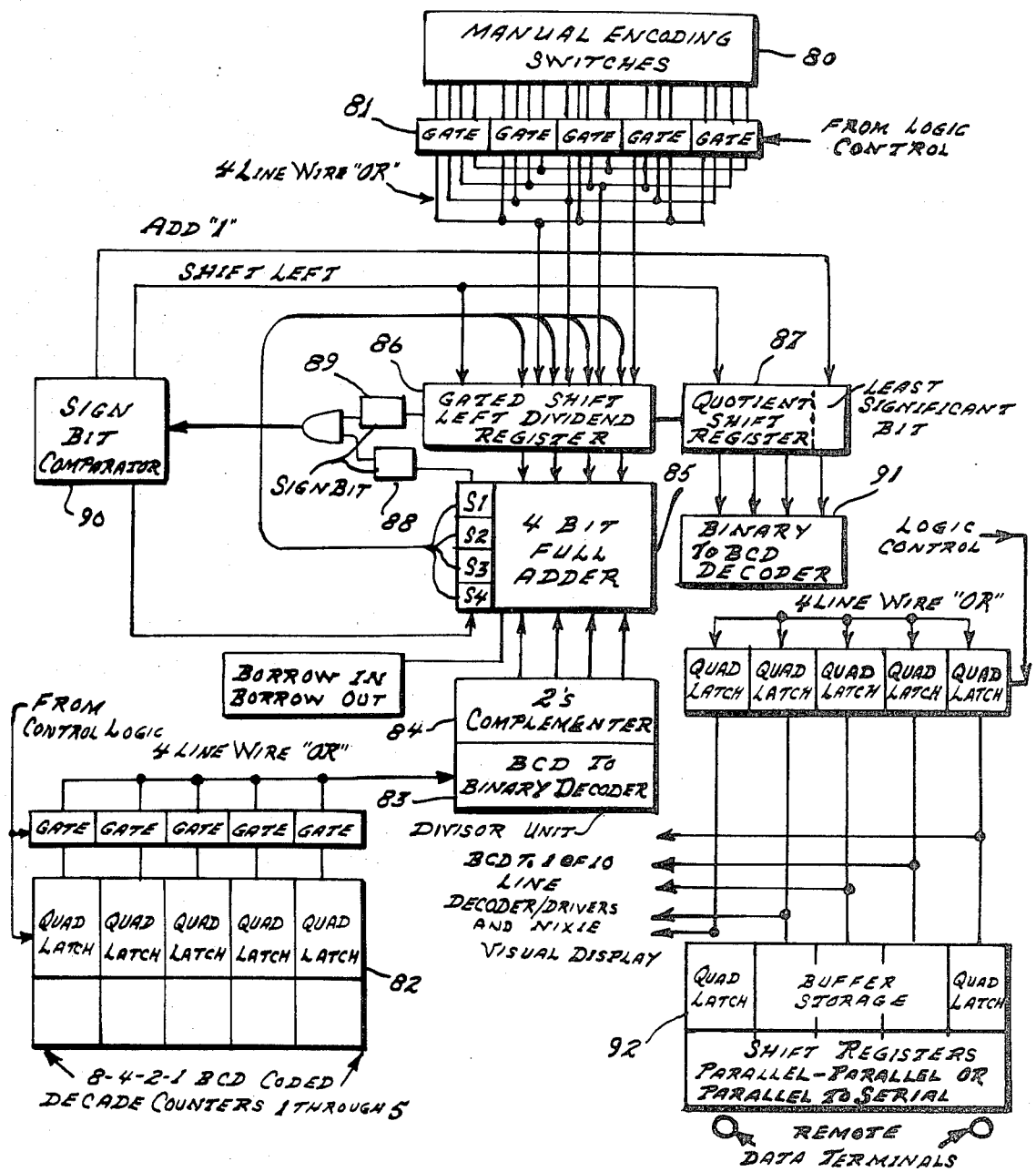
FIG. 5 is a block diagram of the computer unit.

If $\lambda_0/\theta$ is treated as a single term and manually encoded then the computing section performs a single step division to solve for $V_\perp$. The computer circuitry (shown in FIG. 5) is specifically designed for this purpose.

The computer 33 employs all integrated circuit components and to the greater extent uses complex function packages (commercially available). Manual encoding thumb wheel switches 80 are used to encode $\lambda_0/\theta$. A "wired in" redundant pulse pattern generator 81 suppoies the logic control for the circuit, i.e., a number of steps have to be performed in the correct sequence. Binary division is the most difficult and time consuming operation performed by a computer. It is a trial and error process and can be implemented in several ways. The circuit employed here converts all BCD information to Binary numbers (used in the actual division). Taking the 2's complement of the divisor, i.e., changing all 0's to 1's and 1's to 0's and adding a 1 to the least significant digit, permits the use of a multi-bit full adder in the division process.

The raw data from the decade counters 21 consist of five digits of four BCD bits per digit. This information which is temporarily stored in the five quad latches 82, is presented to the computer in parallel-serial form. Thus one (four BCD bit) digit at a time is processed. The data is converted to binary 83, 2's complemented 84 and presented to the adder 85 as the divisor. The $\lambda_0/\theta$ term also treated in four bit groups is gated into the shift left register 86 as the dividend. The quotient register 87 at this time contains all 0's, i.e., has been cleared. The sum of the dividend and the complemented divisor appears at the $S_1$ through $S_4$ terminals of the adder 85. If the adder 85 has produced a "carry" then a "1" appears in the sign bit 88. The dividend register's sign bit 89 at this time will contain a "0" since the dividend is always (in this instance) a positive number. The presence of the "1" signifies that the first trial subtraction (or complement addition) of divisor from dividend has produced a negative remainder. The sign bit comparator 90 detects this as the divisor being larger than the dividend (hence will not go into), and takes corrective action by (1) entering a "0" into the least significant bit of the quotient register 87 and (2) clearing the $S_1$ through $s_4$ terminals to "0" and shifting the dividend 86 and quotient register 87 one bit or step to the left. The first term, or bit, of the quotient then is a "0". Note the left hand bit of the dividend now appears in the sign bit 89. Again the contents of the shifted dividend register 86 and the same complemented divisor 84 are added. If both sign bits 88 and 89 contain a "1" the sign bit comparator 90 sees a "0". The same is true if both sign bits 88 and 89 contain 0's. In the sign bit comparator 90, the following is performed: (1) enters a "1" into the least significant bit of the quotient register 87, (2) the four sum bits $S_1$ through $S_4$ and the sign bit 88 are gated into the dividend register 86, replacing the original contents and leaving the $S_1$ through $S_4$ terminals cleared to "0", and (3) produces a one bit left shift in the dividend 86 and quotient register 87. This trial and error process (where if the remainder is negative, a "0" is entered into the quotient register 87 and a "1" for a positive remainder) is repeated four times by control logic sequence switching. The quotient is then removed from the quotient register 87 reconverted to BCD in decoder unit 91 and placed in the buffer storage 92. A visual nixie type display of the quotient may be utilized if desired.

In the sampling of random time frequency bursts, pedestal height variations (between successive bursts) of 100 to 1 may exist combined with pink noise comparable in amplitude with lower pedestal heights. These signal amplitudes may range from 100 microvolts to greater than 1 volt with various laser system configuration. This places severe requirements upon the bandpass filter channels 12. Conventional automatic gain control may not be employed, due to the small time duration of the sampled signal. Compression amplifiers are not well suited since compression of large amplitude pedestals is accompanied by proportionate compression of the doppler shift information with resultant signal drop-out at pedestal peaks. Dynamic limiting amplifiers produce similar signal drop-out at large pedestal peaks. The resultant effect is to produce two doppler shift pulse trains in correspondence iwith the ascending and descending slopes of the pedestal and a center discontinuity at the filter limiting level. The transient nature of the doppler shift signal requires that the filters be unconditionally stable to an impulse characterization. The presence of noise within the filter pass band may produce spurious triggering of the binary pulse counting chain.

Referring now to FIGS. 6 and 7, a dual pulse train comparator 20 utilizing comparator units 101, 102, is employed to monitor the total period of an 8 pulse train in terms of the period occupied by the first two pulses of the incident doppler shift frequency burst, shown in FIG. 6, line (1). Note: due to the preset state of Binary 103, the first pulse shown as $p_o$-1 does not initiate the count cycle; however, the pulse labeled $p_o$ does. This has been done to permit a small settling time for the binaries following reset action. Thus the $p_o$ to $p_2$ leading edge time interval, FIG. 6, line (3), is the gating interval for the dual train comparator 20. The stretch ratio of unit 101 is set for 7.5/2, and the stretch ratio of unit 102 is set for 8.5/2. Assuming the Binary D waveform, FIG. 6 line (6) is an accurate time extension (factor of 4) of the FIG. 6 line (3) waveform, the terminal edge of the $\Delta 1$, $\Delta 2$ waveforms, FIG. 6 lines (4 and 5) will bracket the terminal edge of the Binary D waveform line (6) within $\pm 6$ percent of the total time interval. If the eight pulse train becomes non-uniform after $p_2$ (leading edge), or terminates short of eight pulses then error signals are generated by the circuit of FIG. 7 which reset the counter and permit a subsequent data sample to be taken. The Binary D pulse width error detection is accomplished by AND and NAND gate implemented Boolean equations:

$$\Delta 1 \cdot D \cdot I = \text{negative error} = \text{reset}$$

This can be seen by examining terminal edges of waveforms 4, 7 and 9 of FIG. 6.

The second equation for reset is given by:

$$\overline{\Delta 2} \cdot \overline{D} \cdot I = \text{positive error} = \text{reset}$$

as seen by waveforms 5, 8 and 10 (FIG. 6) and employing NAND positive logic.

The waveforms 9 and 10 as produced by the set-reset flip flop 104 are included in the error detection to prevent a race condition from occurring at $t_0$ (i.e., $P_o$, leading edge). Gross errors that may exist in the $P_0$ to $P_2$ time interval may also be detected by this circuit or alternately trapped by the $p_{max}$ digital filter.

While in accordance with the provisions of the statutes, we have illustrated and described the best forms of the invention now known to us, it will be apparent to those skilled in the art that changes may be made in the form of the apparatus disclosed without departing from the spirit of the invention as set forth in the appended claims, and that in some cases certain features of the invention may be used to advantage without a corresponding use of other features.

We claim:

1. A doppler shift laser velocimeter data processor apparatus comprising in combination:
   a dual scatter laser velocimeter to provide doppler shift frequency information, said dual scatter laser velocimeter comprising:
   a laser to provide a high intensity laser beam,
   a dual beam optics unit connected to said laser to provide an intersecting dual laser beam, said dual laser beam cross at an intersection point, said intersection point being a probe volume, said probe volume being perpendicular to and passing through the air flow at said intersection point, said probe volume providing scatter radiation after intersecting said air flow,
   a converging lens to direct said scatter radiation to form a point,
   a photomultiplier unit positioned to receive said point-formed scatter radiation from said lens, said photomultiplier unit producing an output signal, in response thereto, said output signal being doppler shift frequency information, and
   a data processor connected to said dual scatter laser velocimeter to receive said doppler shift frequency information, said data processor coding said doppler shift information into binary coded decimal data, said binary coded decimal data being stored within said data processor, said data processor comprises:
   a ten channel filter bank connected to said photomultiplier unit to receive said output signal, said channel filter bank having a range of 1 to 300 MHz and filtering said photomultiplier output signal,
   a pulse averaging binary chain unit to sample said output signal and to provide a counter gating pulse, said pulse having a pulse width $T_0$ to 125 $T_1$,
   a five digit doppler period counter receives a clock pulse train from a 100 MHz crystal oscillator during the interval of said counter gating pulse, said period counter codes said pulse train into binary coded decimal data, said binary coded decimal data being transferred through a series of quad latches, and stored therein,
   a channel time comparator connected to said period counter to monitor said pulse train, said channel time comparator establishing maximum-minimum limits on said counter gating pulse width,
   a pulse train comparator connected to said pulse averaging binary chain unit to detect aberations in said photo-multiplier output signal,
   an error detection unit connected to said channel time comparator and said pulse train comparator to provide an error reset signal for said period counter, said error detection provides a strobe disable signal to the first quad latch, and,
   a computer connected to said quad latch output, said doppler shift information being the velocity of the doppler shift $V_1$, said value of doppler shift velocity, $V_1$, being calculated by said computer,
   a series of plug-in interfacing cards whereby said stored binary coded data can be code-converted, voltage level translated or serialized to interface with a wide variety of commercially available data acquisition or reduction systems, and,
   a data terminal connected to said data processor to provide access to said stored binary coded decimal data.

* * * * *